(12) United States Patent
Rosani

(10) Patent No.: US 10,710,223 B2
(45) Date of Patent: Jul. 14, 2020

(54) PORTABLE WORK EQUIPMENT FOR TRAVELING USE

(71) Applicant: Cembre S.p.A., Brescia (IT)

(72) Inventor: Giovanni Rosani, Brescia (IT)

(73) Assignee: Cembre S.p.A., Brescia (IT)

( * ) Notice: Subject to any disclaimer, the term of this patent is extended or adjusted under 35 U.S.C. 154(b) by 144 days.

(21) Appl. No.: 15/579,156

(22) PCT Filed: May 13, 2016

(86) PCT No.: PCT/IB2016/052763
§ 371 (c)(1),
(2) Date: Dec. 1, 2017

(87) PCT Pub. No.: WO2016/198973
PCT Pub. Date: Dec. 15, 2016

(65) Prior Publication Data
US 2018/0161969 A1 Jun. 14, 2018

(30) Foreign Application Priority Data
Jun. 9, 2015 (IT) .......................... 102015000021720

(51) Int. Cl.
*B25B 27/14* (2006.01)
*H01R 43/04* (2006.01)
(Continued)

(52) U.S. Cl.
CPC ............ *B25B 27/14* (2013.01); *B23D 29/002* (2013.01); *B25B 27/10* (2013.01); *B25B 27/146* (2013.01);
(Continued)

(58) Field of Classification Search
CPC ....... B25B 27/14; B25B 27/146; B25B 27/10; B23D 29/002; H02G 1/005; H01R 43/0428; Y10T 29/53065
See application file for complete search history.

(56) References Cited

U.S. PATENT DOCUMENTS 9,783,936 B2 * 10/2017 Gareis ....................... B25F 3/00
9,939,786 B2 * 4/2018 Kusakawa ............... G04G 9/00
(Continued)

FOREIGN PATENT DOCUMENTS

DE 10 2013 203 553 B3 7/2014
EP 2 801 445 A1 11/2014
(Continued)

*Primary Examiner* — Bayan Salone
(74) *Attorney, Agent, or Firm* — Blank Rome LLP

(57) ABSTRACT

Portable work equipment (30) comprises a portable tool (1) and a portable electronic device (32) with global positioning means (34), in which the portable tool transmits to the electronic device (32) in real time and in wireless manner identification data of the portable tool (1) and data representative of a set of parameters of a work cycle, in which the electronic device (32) generates traceability data-sets by associating to each set of parameters of the work cycle a unique identification code for the portable tool (1), the global positioning coordinates of the portable electronic device (32) and the time of receipt of the set of parameters of the work cycle, and transmits these traceability data-sets to a central database (36) which is remotely accessible provided that the distance between the portable tool (1) and the electronic device (32) is less than a predetermined maximum allowed distance.

11 Claims, 5 Drawing Sheets

Figure 1:
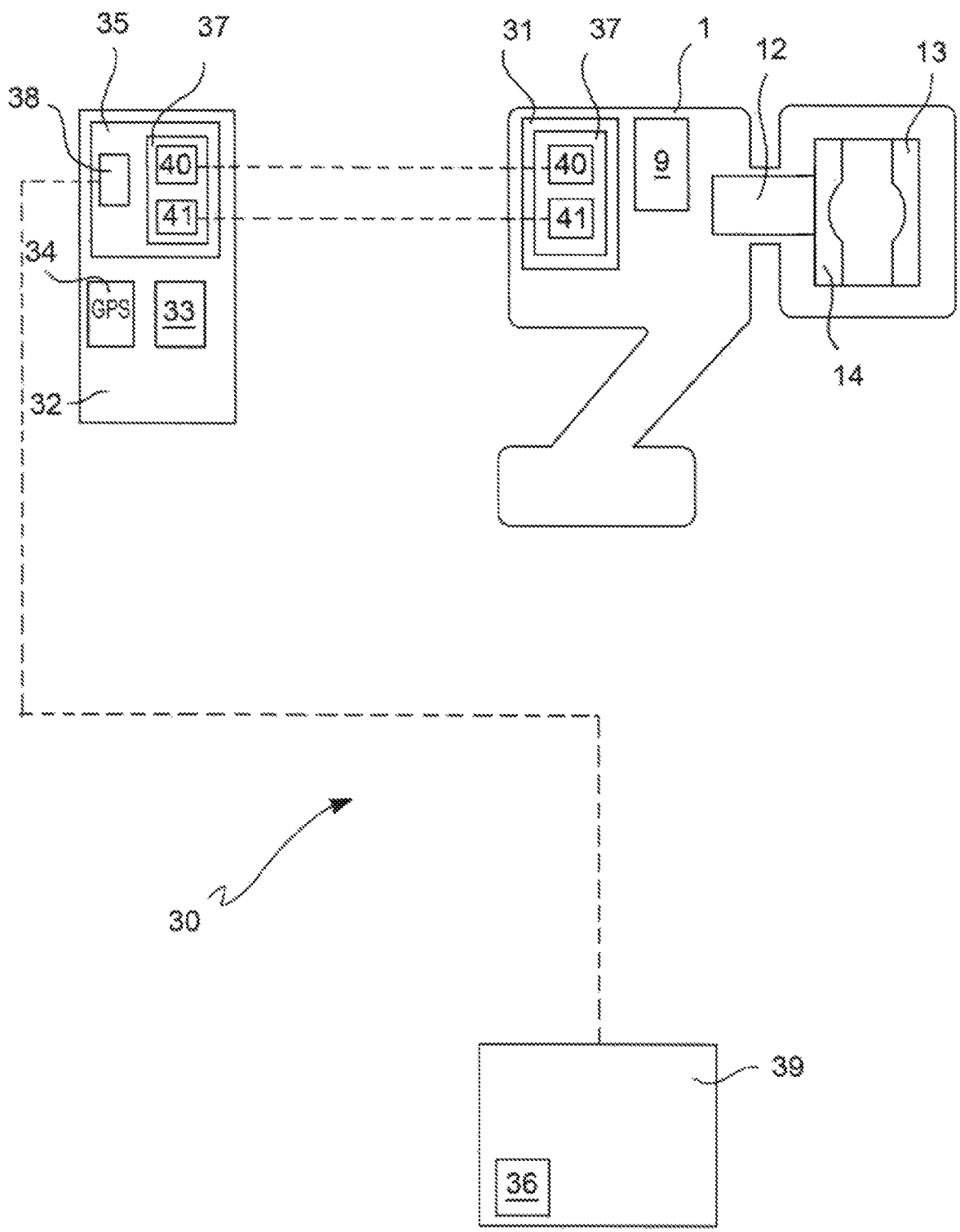

(51) Int. Cl.
*B25B 27/10* (2006.01)
*H02G 1/00* (2006.01)
*B23D 29/00* (2006.01)
*H01R 43/042* (2006.01)

(52) U.S. Cl.
CPC ......... *H01R 43/0428* (2013.01); *H02G 1/005* (2013.01)

(56) References Cited

U.S. PATENT DOCUMENTS

| | | | |
|---|---|---|---|
| 2011/0093110 A1 | 4/2011 | Stencel et al. | |
| 2012/0151093 A1* | 6/2012 | Zheng | G06F 19/3418 709/248 |
| 2014/0240125 A1* | 8/2014 | Burch | G08B 21/0213 340/539.13 |
| 2014/0334270 A1* | 11/2014 | Kusakawa | G04G 9/00 368/9 |
| 2015/0225905 A1* | 8/2015 | Gareis | B25F 3/00 81/469 |
| 2016/0016222 A1* | 1/2016 | Bungter | H01R 43/042 29/515 |

FOREIGN PATENT DOCUMENTS

WO   WO 2012/067602 A1   5/2012
WO   WO 2014/032643 A1   3/2014

\* cited by examiner

PORTABLE WORK EQUIPMENT FOR TRAVELING USE

The present invention relates to a method for operating portable work equipment for traveling use and to portable work equipment for traveling use. More particularly, the present invention relates to a portable compression or cutting system configured to implement the method.

Hydrodynamic compression and/or cutting tools are often used to perform determined connection operations, e.g. compressing connectors on electrical wires or for hydraulic pipes, compressing rivets, or cutting operations, e.g. cutting electrical wires during electrical system installation and maintenance.

Such tools usually comprise an electrical motor supplied by an accumulator and a hydraulic pump which causes an increase of pressure of a hydraulic liquid acting on a piston to move the latter against the bias of a pressure spring. In turn, the piston is connected to a moveable jaw so as to move it during the compression operation towards a fixed jaw of the tool. The jaws may be shaped and/or provided with interchangeable accessory elements so as to adapt to a particular object, e.g. an electrical contact to be compressed or a metallic bar to be cut.

Since the compression tools are very often used in outdoor environments, e.g. along railway lines far from buildings provided with a connection to the electrical network, the checking and traceability of operations, e.g. the compression or cutting, requires the performed work to be recorded manually on work lists or technical tables which contain the commissioned work instructions. These checklist type manual recordings usually do not contain information on the quality or objective result of the performed operations and have the further disadvantage of being compiled by the same workers who perform the work, thus lacking objective control and independent "certification".

Thus, it is the object of the present invention to provide a method for operating portable work equipment for traveling use and portable work equipment for traveling use having features such as to overcome at least part of the disadvantages of the prior art.

It is a particular object of the invention to provide a method and portable work equipment for traveling use which allow a better and more objective traceability of the performed working operations.

A further particular object of the invention is to provide a compression and/or cutting system having such features as to overcome the drawbacks mentioned with reference to the prior art.

These and other objects are achieved by means of portable work equipment for traveling use according to claims 1 and 2.

According to an aspect of the invention, portable work equipment for traveling use comprises:
A) a portable tool adapted to manipulate work pieces by performing work cycles, said tool having:
a manipulator group adapted to engage and manipulate a piece to be worked,
a actuation motor which co-operates with the manipulator group for performing the work cycles,
a first control system which detects and acquires values representative of parameters of said work cycles,
first wireless communication means connected to the first control system,
B) a portable electronic device, comprising:
a second control system,
global positioning means (GPS) connected to the second control system,
second wireless communication means connected to the second control system,
in which the first control system is adapted to transmit an identification signal of the portable tool and a signal representative of a set of parameters of the current work cycle by means of the first wireless communication means in real time,
wherein the second control system is adapted to:
receive signals representative of global positioning coordinates of the portable electronic device from the global positioning means in real time,
receive the identification signal of the portable tool and the signal representative of the set of parameters of the work cycle by means of the second means of communication in real time,
generate traceability data-sets by associating to each set of parameters of the work cycle:
a unique identification code for the portable tool or the portable electronic device,
the global positioning coordinates of the portable electronic device at the moment of receipt of the signal representative of the set of parameters of the work cycle,
the date and time of receipt of the signal representative of the set of parameters of the work cycle,
transmit these traceability data-sets to a central database which is remotely accessible,
wherein the generation of said traceability data-sets is performed only for those work cycles of the portable tool 1 during which a distance between the portable tool 1 and the electronic device is less than a predetermined allowed distance.

According to a further aspect of the invention, a portable work equipment for traveling use comprises:
A) a portable tool adapted to manipulate work pieces by performing work cycles, said tool having:
a manipulator group adapted to engage and manipulate a piece to be worked,
a actuation motor which co-operates with the manipulator group for performing the work cycles,
a first control system which detects and acquires values representative of parameters of said work cycles,
global positioning means (GPS) connected to the first control system,
first wireless communication means connected to the first control system,
B) a portable electronic device, comprising:
a second control system,
second wireless communication means connected to the second control system, in which the first control system is adapted to:
receive signals representative of global positioning coordinates of the portable tool from the global positioning means in real time,
transmit an identification signal of the portable tool, a signal representative of a set of parameters of the current work cycle and a signal representative of the momentary global positioning coordinates of the portable tool by means of the first wireless communication means in real time,
in which the second control system is adapted to:
receive the identification signal of the portable tool, the signal representative of the set of parameters of the work cycle and the signal representative of the momentary global positioning coordinates of the portable tool by means of the second wireless communication means in real time, generate traceability data-sets by associating to each set of parameters of the work cycle:

a unique identification code for the portable tool or the portable electronic device, the global positioning coordinates of the portable tool at the moment of receipt of the signal representative of the set of parameters of the work cycle, the date and time of receipt of the signal representative of the set of parameters of the work cycle, transmit these traceability data-sets to a central database which is remotely accessible, in which the generation of said traceability data-sets is performed only for those work cycles of the portable tool during which a distance between the portable tool and the electronic device is less than a predetermined allowed distance.

This allows a traceability which cannot be influenced by the portable tool user and reliable traceability and checking of the performed work conditions and result (work cycle parameters), of the site in which a given work cycle was performed (global positioning data), of the date/time and of the person who performed it (portable electronic device holder).

In addition to the more objective, and thus more certifiable, traceability of the performed work, the equipment allows traceability of the information concerning the performed work cycles without hindering or interrupting the performance of the work itself.

Figures 2, 3:
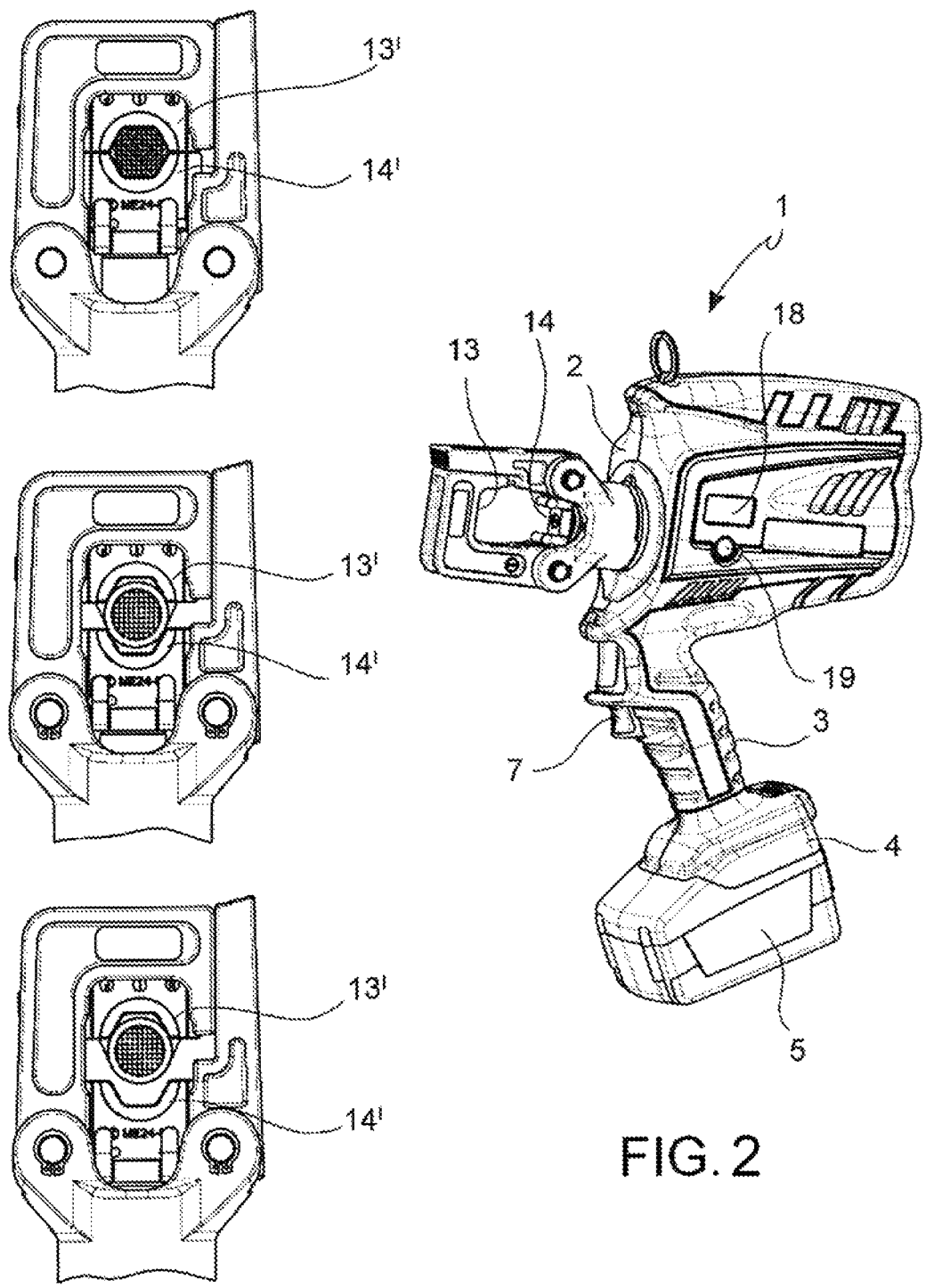
Figure 4:
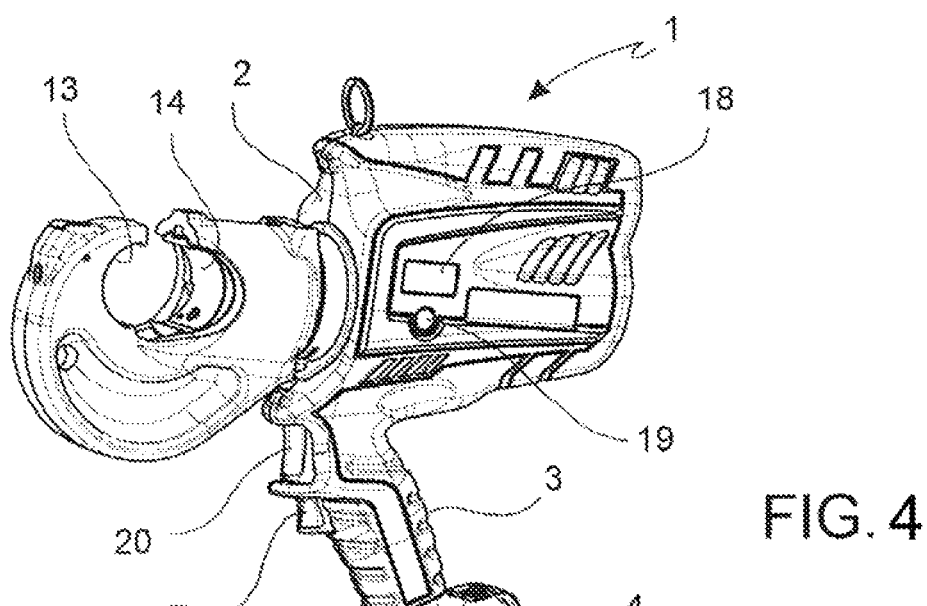
Figure 5:
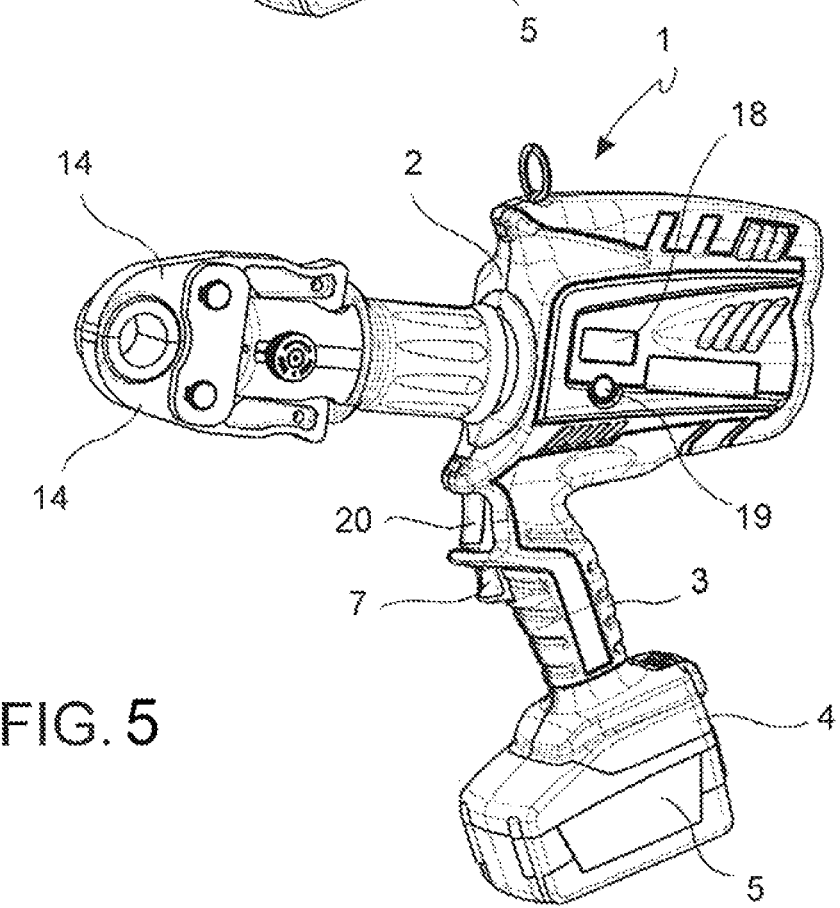
Figure 6:
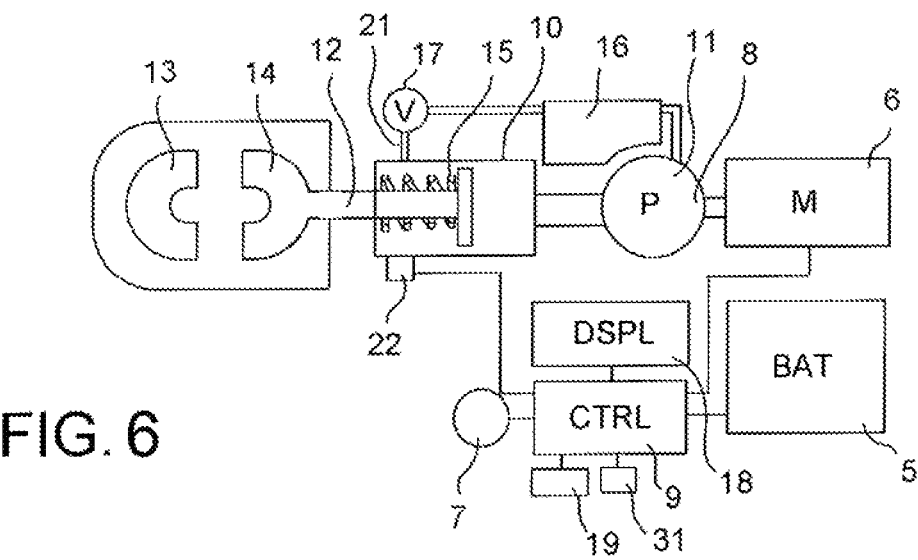
Figure 7:
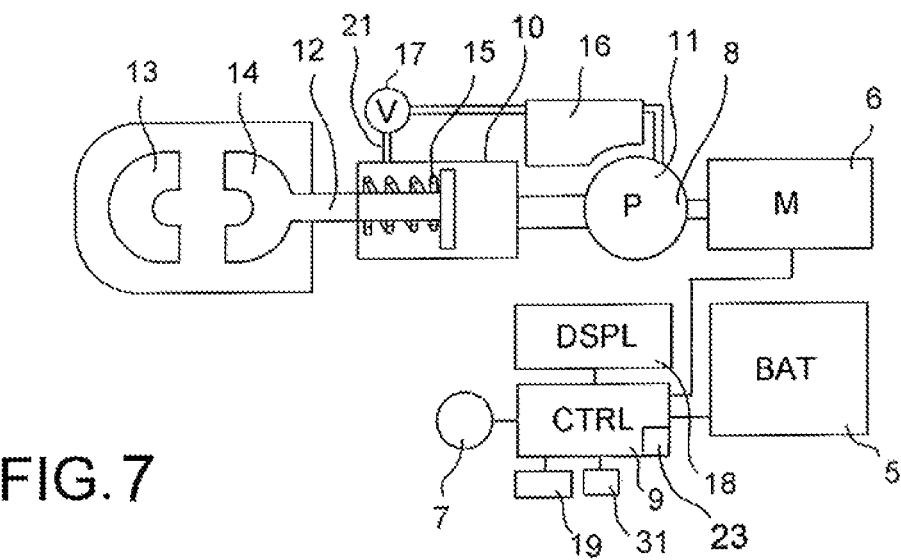
Figure 8:
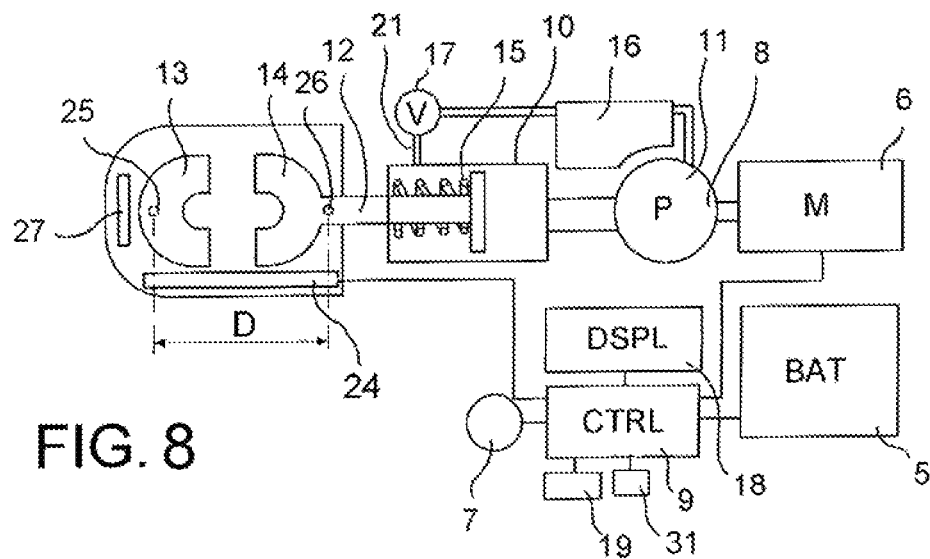
Figure 9:
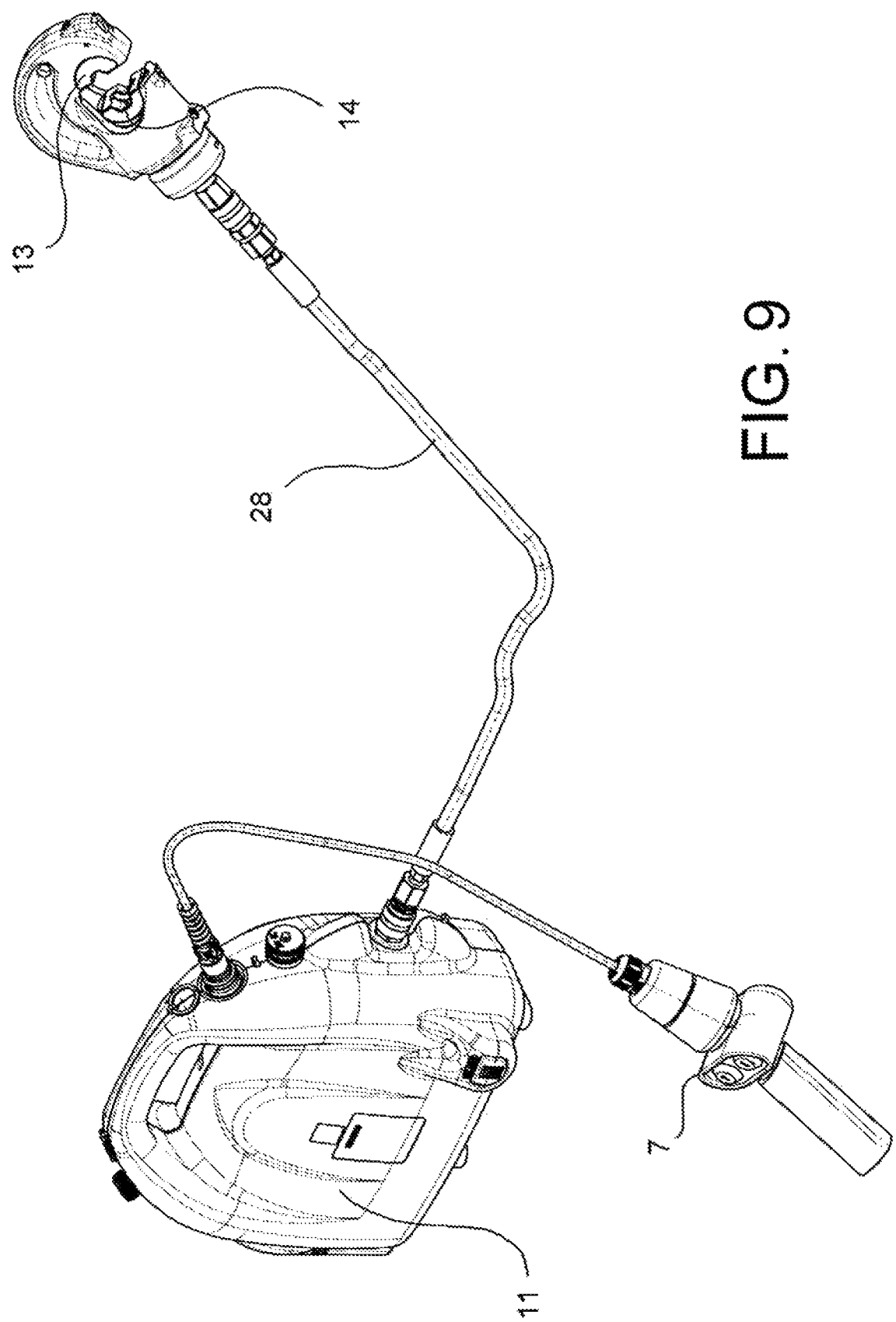

In order to understand the invention and better appreciate the advantages, the description of some embodiments will be provided below by way of non-limiting example with reference to the accompanying figures, in which:

FIG. 1 diagrammatically shows a portable work equipment and a traceability system according to an embodiment of the invention, FIG. 2 is a perspective view of a portable electro-hydraulic compression or cutting tool according to an embodiment of the invention provided with a compression head adapted to receive inserts or interchangeable jaw dies, FIG. 3 shows a movement sequence of the compression head of the tool in FIG. 2, FIGS. 4 and 5 show electro-hydraulic compression tools according to embodiments of the invention provided with translating and/or rotating jaws for compressing electrical and/or hydraulic connectors, FIGS. 6, 7, 8 diagrammatically show electro-hydraulic compression tools and control systems thereof according to embodiments of the invention, FIG. 9 shows a compression tool in which the compression head is distanced from the pump group and connected thereto by means of a pressurized flexible pipe.

With reference to the figures, a portable working equipment or system 30 for traveling use comprises:

A) a portable tool 1 or hand tool adapted to manipulate work pieces by performing work cycles, said tool 1 having:

a manipulator group 12,13,14 adapted to engage and manipulate a piece to be worked, a actuation motor 6 which co-operates with the manipulator group 12, 13, 14 for performing the work cycles, a first control system 9, 22, 23, 24 which detects and acquires values representative of parameters of said work cycles, first wireless communication means 31 connected to the first control system 9, B) a portable electronic device 32, comprising:

a second control system 33, global positioning means (GPS) 34 connected to the second control system 33, second wireless communication means 35 connected to the second control system 33, in which the first control system 9 is adapted to transmit an identification signal or data of the portable tool 1 and a signal or data representative of a set of parameters of the current work cycle by means of the first wireless communication means 31 in real time, in which the second control system 33 is adapted to:

receive signals or data representative of global positioning coordinates of the portable electronic device 32 from the global positioning means 34 in real time, receive the identification signal or data of the portable tool 1 and the signal or data representative of the set of parameters of the work cycle by means of the second means of communication 35 in real time, generate traceability data-sets by associating to each set of parameters of the work cycle:

a unique identification code for the portable tool 1 or for the portable electronic device 32 or for both, the global positioning coordinates of the portable electronic device 32 in (or referred to) the moment of receipt of the signal or the data representative of the set of parameters of the work cycle, the date and time of receipt of the signal representative of the set of parameters of the work cycle, transmit these traceability data-sets by means of the second wireless communication means 35 to a central database 36 which is remotely accessible, in which the generation of said traceability data-sets is performed only for those work cycles of the portable tool 1 during the performance of which a distance between the portable tool 1 and the electronic device 32 is less than a predetermined allowed distance.

According to an alternative embodiment, the portable work equipment 30 for traveling use comprises:

A) a portable tool 1 adapted to manipulate work pieces by performing work cycles, said portable tool 1 having:

a manipulator group 12, 13, 14 adapted to engage and manipulate a piece to be worked, a actuation motor 6 which co-operates with the manipulator group 12, 13, 14 for performing the work cycles, a first control system 9, 22, 23, 24 which detects and acquires values or data representative of parameters of said work cycles, global positioning means (GPS) (34) connected to the first control system (9), first wireless communication means 31 connected to the first control system 9, B) a portable electronic device 32, comprising:

a second control system 33, second wireless communication means 35 connected to the second control system 33, in which the first control system 9 is adapted to:

receive signals or data representative of global positioning coordinates of the portable tool 1 from the global positioning means 34 in real time, transmit an identification signal or data of the portable tool 1, a signal or data representative of a set of parameters of the current work cycle and a signal or data representative of the momentary global positioning coordinates of the portable tool 1 by means of the first wireless communication means 31 in real time, in which the second control system 33 is adapted to:

receive the identification signal or data of the portable tool 1, the signal or data representative of the set of parameters of the work cycle and the signal or data representative of the momentary global positioning coordinates of the portable tool 1 by means of the second wireless communication means 35 in real time, generate traceability data-sets by associating to each set of parameters of the work cycle:

a unique identification code for the portable tool 1 or for the portable electronic device 32 or for both, the global positioning coordinates of the portable tool 1 in (or referred to) the moment of receipt of the signal or the data representative of the set of parameters of the work cycle, the date and time of receipt of the signal or data representative of the set of parameters of the work cycle, transmit these traceability data-sets by means of the second wireless communication means 35 to a central database 36 which is remotely accessible, in which the generation of said traceability data-sets is performed only for those work cycles of the portable tool 1 during the performance of which a distance between the portable tool 1 and the electronic device 32 is less than a predetermined allowed distance.

This allows traceability which cannot be influenced by the user of the portable tool 1 and reliable traceability and checking of the performed work conditions and result (work cycle parameters), of the site in which a given work cycle was performed (global positioning data), of the date/time and of the person who performed it (portable electronic device holder 32).

In addition to the more objective, and thus more certifiable, traceability of the performed work, the equipment 30 allows traceability without hindering the performance of the work itself.

According to an embodiment, the first wireless communication means 31 may comprise short-range wireless communication means, the communication distance of which is less than 10 meters, preferably less than 2 meters, and defines the predetermined admissible distance range.

According to further embodiments, which can be mutually combined or are alternative:

The portable tool 1 may comprise a compression tool for compressing electrical connectors or for cutting electrical conductors, e.g. a tool 1 as shown in figures from 2 to 9 and which will be described further below.

The actuation motor 6 may comprise an electrical motor or a combustion engine.

The work cycle parameters, in particular the compression or cutting parameters, may comprise one or more of the following:

a sequential work cycle number, an identification of the type of electrical connector, a maximum pressure of hydraulic oil reached in the work cycle, a maximum compression or cutting force reached in the work cycle, one or more error messages, one or more anomaly warnings, a number of residual work cycles until a scheduled maintenance.

In order to communicate with one another, the first wireless communication means 31 and the second wireless communication means 35 may comprise short-range wireless transceiver means 37 based on a same technology. Such a technology may be a known technology with an adequate range of action, such as for example RFID (Radio Frequency Identification), NFC (Near Field Communication), IrDA (infrared), Bluetooth, ISM band, UWB (Ultra-Wide Band), Wireless HART, ZigBee.

The portable electronic device 32 may comprise one of the following: mobile phone, laptop computer, hand-held computer, wrist microcomputer, etc.

The second wireless communication means 35 may further comprise wireless connection means 38 to connect to a telecommunication network, e.g. to a mobile phone network or to a Wi-Fi network, to communicate with a remote computer 39 for the transmission of traceability data-sets to the central database 36.

The first and second wireless communication means 31, 35, e.g. the short-range wireless transceiver means 37, may comprise and use a first wireless communication system 40 for the transmission of the identification signal or data of the portable tool 1, e.g. by means of RFID (Radio Frequency Identification) technology, and a different second wireless communication system 41 for the transmission of the signals or data representative of the work cycle parameters and/or, if envisaged, of the global positioning signals or data. In such a case, the maximum permitted distance may be determined by the smaller range of action of the two different wireless communication systems 40, 41.

In the description, the expression "current or momentary work cycle" means:

a work cycle which has not be completed yet or the last work cycle which has been completed without a later work cycle having been started or a work cycle in which the manipulation step of the work piece, e.g. the compression of the electrical connector or the cutting of the electrical conductor, is in progress or has been completed for less than 10 seconds, preferably less than 5 second, even more preferably less than 1 second.

According to embodiments (FIGS. 2-8), the portable work tool 1 may be a hydrodynamic compression and/or cutting tool 1. The tool 1 comprises a housing 2 with a grip-shaped portion 3 and a coupling portion 4 for connecting, preferably by snapping, a replaceable and rechargeable electrical accumulator 5. The housing 2 accommodates an electrical motor 6 which can be supplied by the accumulator 5 by means of a power and control circuit provided with a switch on which a manual actuation button 7 arranged adjacent to the grip 3 acts.

A transformation mechanism 8, e.g. a crankshaft or camshaft, is arranged in the housing 2 and connected to the actuation shaft of the motor 6 so as to transform the rotary motion of the actuation shaft into a cyclic or alternating motion, e.g. translational. A hydraulic pump 11, also accommodated in the housing 2, is connected to the transformation mechanism 8 and is adapted to perform, in response to the cyclic or alternating motion of the transformation mechanism 8, an increase of pressure acting on a actuation piston 12 so as to move the actuation piston 12 along a piston stroke.

In an embodiment, the tool 1 further comprises a fixed jaw 13 rigidly connected to the housing 2 and arranged at a front end of the tool, as well as a moveable jaw 14 supported in the housing so as to be able to slide with respect to the fixed jaw 13. The moveable jaw 14 is connected to the actuation piston 12 so that it is moved towards the fixed jaw 13 in response to the movement of the actuation piston 12 from an open position to a closed position to perform the compression or cutting operation.

In the open position, the jaws 13, 14 are distanced apart to be able to accommodate an object to be compressed or cut and, in the closed position, the jaws 13, 14 are approached to each other and directly rest (in particular against each other) to prevent a further mutual approach.

A return spring 15 acts between the fixed jaw and the actuation piston 12, so as to bias the latter elastically in the resting position and the moveable jaw 14 in the open position moved away from the fixed jaw 13.

According to an embodiment, the hydraulic pump 11 comprises a tank 16, a pumping cylinder-piston group, a actuation cylinder-piston group and a maximum pressure valve 17.

The pumping cylinder-pump group may comprise a pumping cylinder with an intake opening connected to the tank 16 by means of a check valve which allows the flow of hydraulic oil from the tank 16 in the pumping cylinder and a discharge opening connected to a actuation cylinder 10 of the actuation cylinder-piston group by means of a one way (non-return) valve which allows the flow of hydraulic oil from the pumping cylinder into the actuation cylinder 10. A pumping piston coupled so as to translate together with a pivoting member (e.g. an elbow portion) of the transformation mechanism 8 may be accommodated in the pumping cylinder.

The actuation cylinder-piston group comprises the actuation piston 12 connected to the moveable jaw 14 and arranged in the actuation cylinder 10.

The maximum pressure valve 17 is arranged in a return duct 21 of the fluid which connects the actuation cylinder 10 to the tank 16 (FIGS. 6, 7, 8).

In this manner, the alternating translational movement of the transformation mechanism 8 generated by the rotary movement of the actuation shaft causes an oscillating translational movement of the pumping piston which pumps the pressurized liquid from the tank 16 to the actuation cylinder 10 to make the actuation piston 12 move forward and, together with it, the moveable jaw 14 from the open position into the closed position until reaching a predetermined maximum calibration pressure in the actuation cylinder 10. When the maximum calibration pressure is reached, the maximum pressure valve 17 automatically opens the return pipe 21 of the fluid to discharge the pressurized liquid from the actuation cylinder 10 into the tank 16.

To monitor the reaching of the closing position, there may be provided a sensor 22, 23, 24 and an electronic control circuit 9 connected to the sensor 22, 23, 24 and to the electrical motor 6, and the actuation of the electrical motor 6 may be interrupted in dependency of a signal of the sensor 22, 23, 24 which confirms the reaching of the closed position of the jaws 13, 14.

According to an embodiment (FIG. 6), the monitoring of the reaching of the closed position may comprise:
detecting at predetermined time intervals (or at predetermined pumping cycle intervals of the hydraulic pump 11) the pressure of the hydraulic liquid which acts on the actuation piston 12, using a pressure sensor 22 connected to the electronic control circuit 9,
by means of the electronic control circuit 9, calculating a pressure difference detected at the beginning and at end of each of said predetermined time intervals (or predetermined pumping cycle intervals) and comparing the calculated pressure difference with a reference value indicative of the closed position of the jaws 13, 14.

According to a further embodiment (FIG. 7), the monitoring of the reaching of the closed position may comprise:
detecting at predetermined time intervals $\Delta t$ (or at predetermined pumping cycle intervals $n_p$) an electrical value indicative of the power drawn by the motor, using an electrical sensor 23 connected to the electronic control circuit 9,
by means of the electronic control circuit 9, calculating a difference between the electrical value detected at the beginning and the one detected at the end of each of said predetermined time interval $\Delta t$ (or predetermined pumping cycle interval $n_p$) and comparing the calculated electrical value difference with a reference value indicative of the closed position of the jaws 13, 14.

For example, in the case of a direct current motor 6 with known impedance, the electrical current I drawn by the motor 6 may be used as electrical value indicative of the power drawn by the motor 6 and may be detected by means of a current sensor 23.

According to a further embodiment (FIG. 8), the monitoring of the reaching of the closed position comprises:
detecting at predetermined time intervals $\Delta t$ (or at predetermined pumping cycle intervals $n_p$) a distance D between two reference points 25, 26 of the two jaws 13, 14, using a distance sensor 24, e.g. an optical sensor or a linear transducer, connected to the electronic control circuit 9,
by means of the electronic control circuit 9, calculating a difference $\Delta D$ of the distance D detected at the beginning and at the end of each of said predetermined time intervals $\Delta t$ (or predetermined pumping cycle interval $n_p$) and comparing the calculated distance difference $\Delta D$ with a reference value $\Delta Dref$ indicative of the closed position of the jaws 13, 14.

According to a further embodiment of the invention (FIG. 8), the monitoring of the reaching of the closed position comprises:
detecting at predetermined time intervals $\Delta t$ (or at predetermined pumping cycle intervals $n_p$) a distance D between two reference points 25, 26 of the two jaws 13, 14, using a distance sensor 24, e.g. an optical sensor or a linear transducer, connected to the electronic control circuit 9,
by means of the electronic control circuit 9, comparing the detected distance D with a reference value Dref indicative of the closed position of the jaws 13, 14.

In an embodiment, means and method steps may be envisaged to identify a jaw type or a type of die or insert for exchangeable jaws (to adapt the tool 1 to the shape of the object to be compressed or cut) and possibly to determine the reference value as a function of the identified jaw type or jaw insert type.

The type of jaw or die or insert may be identified automatically, e.g. by means of an identification detector 27 connected to the control circuit 9 and adapted to detect a feature identifying the jaws 13, 14 or of the inserts for jaws 13', 14' (FIG. 3), for example:
a shape feature of a mechanical interface of the jaw or of the insert,
an optical or chromatic feature of an optical interface of the jaw or of the insert,
a magnetic feature of a mechanical interface of the jaw or of the insert,
an electrical feature of an electrical interface of the jaw or of the insert,
a signal of a radio frequency identification tag (RFID-tag) of the jaw or insert, and subsequent determination of the reference value Dref as a function of the identified type of jaw or insert for jaw.

Similarly, it may be envisaged to identify automatically the type of object to be compressed or cut and possibly to switch off the electrical motor or other tool functions at least also in dependency of the identified type of object.

An object identification detector may be envisaged to identify the object to be compressed or cut which may be made and configured as the identification detector 27 described above. Alternatively, the object identification detector may comprise a position sensor configured to detect a position of the actuation piston, in which the electronic control circuit is in signal connection with the pressure sensor, with the position sensor and with the electrical motor, and configured to identify an object engaged by the jaws 13, 14 in dependency of the pressure of the hydraulic liquid detected by the pressure sensor and the position of the actuation piston detected by the position sensor during an actuation of the electrical motor. Such an identification of the object may be carried out automatically and for example by means of the following steps:

Identifying, on the basis of the monitored pressure, an engagement moment in which the jaws engage the object arranged between them and in which the object compression starts, detecting a compression start position of the actuation piston at the time of engagement, identifying the object engaged by the jaws in dependency of the detected compression start position.

Advantageously, the step of monitoring the reaching of the closed position is carried out automatically and the electronic control circuit 9 automatically switches off the electrical motor 6 when the closed position of the jaws 13, 14 is reached.

For implementing the functions described hereto, the compression or cutting tool 1 may comprise one or more of the aforesaid:

pressure sensor 22, electrical value sensor, in particular current sensor 23, distance sensor 24, switch, e.g. electrical or optical, sensor 27 for identifying the jaws and/or the inserts for jaws, device for identifying the object to be compressed or cut, connected to the electronic control circuit 9, thereby forming together a monitoring device which monitors the reaching of the closed position of the jaws 13, 14 and which, when the closed position is reached, generates the confirmation signal, and in which the electronic control circuit 9 is configured to automatically interrupt the actuation of the electrical motor 6 when the closed position is reached and in dependency of the confirmation signal.

According to the embodiment, the sensor 22,23,24 on the tool 1 is configured to perform the operations described above with reference to the method and not repeated here for the sake of brevity.

The electronic control circuit 9 is configured to process the signals coming from the sensor 22,23,24 and to control the electrical motor 6 according to the method steps described above.

The control circuit 9 comprises a processing unit (CPU), a memory (internal or external) associated with the processing unit (CPU), a communication interface associated with the processing unit (CPU) and adapted to receive signals (pressure, current, position, connector or insert types) from the sensor 22, 23, 24, 27 and to transmit the control signals to the electrical motor 6. The control circuit 9 further comprises an electronic processor program loaded in the memory and configured to process the signals and the operations needed to implement the method of operating the tool 1. The control circuit 9 is connected to the accumulator 5 when the accumulator 5 is coupled to the tool 1 and could also have an own battery, possibly adapted to be charged when the control circuit 9 is connected to the accumulator 5.

According to an embodiment, the tool 1 comprises a user interface 19, e.g. a keypad, connected to the control circuit 9, which allows the user to select the operation with automatic switch-off of the motor 6 when the closed position of the jaws 13, 14 is reached or, alternatively, a traditional operation with reaching of the maximum calibration pressure.

The tool 1 further comprises a display 18, e.g. an LCD or LED display, connected to the control circuit 9 which is configured to determine, by means of such a display 9, a visualization of the selected operating mode, of a value indicative of a maximum reached compression force, as well as a confirmation of the result of the compression process.

The hydrodynamic compression and/or cutting tool 1 may be of the type comprising a single housing or alternatively of the type in which the hydraulic pump 11 may be separated and distanced from the compression and/or cutting head (actuation piston 12, jaws 13, 14) and connected thereto by means of a flexible pressure pipe 28 (FIG. 9) for the hydraulic oil.

The operation of the tool 1 and of the entire portable work equipment is described below.

Pressing the actuation button 7, a micro switch of the control circuit 9 is actuated, which starts the electrical motor 6 and at the same time starts to receive and process the signals indicative of the fluid pressure detected by the pressure sensor 22.

The control circuit 9 is configured so that the electrical motor 6 stays on only with the actuation button 7 pressed and is thus automatically switched off when the actuation button 7 is released. When the jaws 13, 14 reach the closed position, the control circuit 9 automatically switches off the electrical motor 6 before reaching the maximum calibration pressure which would cause the automatic opening of the maximum pressure valve 17. Now the actuation button 7 may be released.

For the return of the actuation piston 12 to its resting position (jaws open), the tool 1 may comprise a member 20 for a manual actuation or, alternatively, means for an automatic actuation of a discharge valve of the hydraulic liquid from the actuation cylinder in the tank.

During or after the conclusion of the current working cycle of the compression tool 1, and provided that the portable electronic device 32 is within the predetermined maximum distance from the compression tool 1, the first and second wireless communication means 31, 35 automatically establish a data connection between the compression tool 1 and the portable electronic device 32 and transmit data from the tool 1 to the electronic device 32.

The electronic device 32 generates the traceability data-sets and connects either automatically or in response to a user command, in wireless mode, to the remote computer 39, and transmits the traceability data-sets to the remote computer 39 (preferably but not necessarily in real time).

The remote computer 39 is configured to transmit and save the traceability data-set in the central database 36.

Browsing the central database 36 allows an easy and reliable traceability of the work cycle execution conditions.

Obviously, with the aim to satisfy specific requirements, a person skilled in art may make further changes and variants to the work equipment 30 and to the method according to the present invention, all without departing from the scope of protection of the invention, as defined in the following claims.

The invention claimed is:

1. Portable work equipment for travelling use, comprising:

A) a portable tool suitable for manipulating work pieces by performing work cycles, said tool having:
  a manipulating group suitable for manipulating pieces to be processed by means of said work cycles,
  a actuation motor which co-operates with the manipulating group for performing the work cycles,
  a first control system which detects and acquires values representative of parameters of said work cycles,
  first wireless communication means connected to the first control system,
B) a portable electronic device, comprising:
  a second control system,
  global positioning means connected to the second control system,
  second wireless communication means connected to the second control system, in which the first control system is suitable to transmit by means of the first wireless communication means in real-time identification data of the portable tool and data representative of a set of parameters of the current work cycle,
  wherein the second control system is adapted to:
  receive in real time from the global positioning means data representative of global positioning coordinates of the portable electronic device,
  receive in real time, by means of the second means of communication, the identification data of the portable tool and the data representative of the set of parameters of the work cycle,
  generate traceability data-sets by associating to each set of parameters of the work cycle:
    a unique identification code for the portable tool or for the portable electronic device or for both,
    the global positioning coordinates of the portable electronic device referred to the moment of receipt of the signal or of the data representative of the set of parameters of the work cycle,
    the date and time of receipt of the data representative of the set of parameters of the work cycle,
  transmit these traceability data-sets by means of the second wireless communication means to a central database which is remotely accessible,
    wherein the central database is separate and remote from the electronic control device and the portable tool, and
    wherein the generation of said traceability data-sets is performed only for those work cycles of the portable tool during the performance of which a distance between the portable tool and the electronic device is less than a predetermined maximum allowed distance.

2. Portable work equipment for travelling use, comprising:
A) a portable tool suitable for manipulating work pieces by means of performing work cycles, said tool having:
  a manipulating group suitable for manipulating pieces to be processed by means of said work cycles,
  a actuation motor which co-operates with the manipulator unit to perform the work cycles,
  a first control system which detects and acquires values representative of parameters of said work cycles,
  global positioning means (GPS) connected to the first control system,
  first wireless communication means connected to the first control system,
B) a portable electronic device, comprising:
  a second control system,
  second wireless communication means connected to the second control system,
  wherein the first control system is adapted to:
  receive in real time from the global positioning means data representative of global positioning coordinates of the portable tool,
  transmit in real time, by means of the first wireless communication means, identification data of the portable tool and data representative of a set of parameters of a current work cycle and data representative of the momentary global positioning coordinates of the portable tool,
  wherein the second control system is adapted to:
  receive in real time, by means of the second wireless communication means, the identification data of the portable tool, the data representative of the set of parameters of the work cycle and the data representative of the momentary global positioning coordinates of the portable tool,
  generate traceability data-sets by associating to each set of parameters of the work cycle:
    a unique identification code for the portable tool or for the portable electronic device or for both,
    the global positioning coordinates of the portable tool referred to the moment of receipt of the data representative of the set of parameters of the work cycle,
    the date and time of receipt of the data representative of the set of parameters of the work cycle,
  transmit said traceability data-set by means of the second wireless communication means to a central database which is accessible remotely,
  wherein the generation of said traceability data-sets is performed only for those work cycles of the portable tool during the performance of which a distance between the portable tool and the electronic device is less than a predetermined maximum allowed distance;
  wherein the portable tool is a compression tool for compressing electrical connectors or for cutting electrical conductors,
  wherein the work cycle parameters comprise one or more of:
    a progressive work cycle number,
    an identification of the type of electrical connector,
    a maximum pressure of hydraulic oil reached in the work cycle,
    a maximum compression or cutting force reached in the work cycle,
    an error message,
    an anomaly warning,
    a number of residual work cycles up to a scheduled maintenance, and
  wherein said current work cycle is a work cycle whose manipulation step of the work piece is in progress or has been completed by less than 5 seconds.

3. Equipment according to claim 1, wherein the first wireless communication means comprise short-range wireless transceiver means the communication distance of which defines the predetermined maximum allowed distance range and is less than 10 meters, preferably less than 2 meters.

4. Equipment according to claim 1, wherein the portable tool is a compression tool for compressing electrical connectors or for cutting electrical conductors, wherein the work cycle parameters comprise one or more of:
  a progressive work cycle number,
  an identification of the type of electrical connector, a maximum pressure of hydraulic oil reached in the work cycle,
a maximum compression or cutting force reached in the work cycle,
an error message,
an anomaly warning,
a number of residual work cycles up to a scheduled maintenance.

5. Equipment according to claim 1, wherein, for communicating with each other, the first wireless communication means and the second wireless communication means comprise short-range wireless transceiver means based on a technology selected in a group consisting of RFID (Radio Frequency Identification), NFC (Near Field Communication) IrDA, (infrared), bluetooth, ISM band, UWB (Ultra Wide Band), Wireless HART, ZigBee.

6. Equipment according to claim 1, wherein the portable electronic device is a mobile phone.

7. Equipment according to claim 1, wherein the second wireless communication means comprise wireless connection means adapted to connect to a telecommunication network and to communicate, by means of the telecommunication network, with a remote computer for the transmission of the traceability data-sets to the central database.

8. Equipment according to claim 1, wherein the first and second wireless communication means comprise and use a first wireless communication system for the transmission of identification data of the portable tool and a different second wireless communication system for the transmission of the data representative of the work cycle parameters.

9. Equipment according to claim 1, wherein said current work cycle is a work cycle whose manipulation step of the work piece is in progress or has been completed by less than 5 seconds, preferably less than 1 second.

10. Equipment according to claim 1, wherein the first wireless communication means comprise short-range wireless transceiver means the communication distance of which defines the predetermined maximum allowed distance range and is less than 10 meters, preferably less than 2 meters,
wherein the portable tool is a compression tool for compressing electrical connectors or for cutting electrical conductors,
wherein the work cycle parameters comprise one or more of:
a progressive work cycle number,
an identification of the type of electrical connector,
a maximum pressure of hydraulic oil reached in the work cycle,
a maximum compression or cutting force reached in the work cycle,
an error message,
an anomaly warning,
a number of residual work cycles up to a scheduled maintenance,
wherein, for communicating with each other, the first wireless communication means and the second wireless communication means comprise short-range wireless transceiver means based on a technology selected in a group consisting of RFID (Radio Frequency Identification), NFC (Near Field Communication) IrDA, (infrared), bluetooth, ISM band, UWB (Ultra Wide Band), Wireless HART, ZigBee,
wherein the portable electronic device is a mobile phone,
wherein the second wireless communication means comprise wireless connection means adapted to connect to a telecommunication network and to communicate, by means of the telecommunication network, with a remote computer for the transmission of the traceability data-sets to the central database,
wherein the first and second wireless communication means comprise and use a first wireless communication system for the transmission of identification data of the portable tool and a different second wireless communication system for the transmission of the data representative of the work cycle parameters,
wherein said current work cycle is a work cycle whose manipulation step of the work piece is in progress or has been completed by less than 5 seconds.

11. Equipment according to claim 2, wherein the first wireless communication means comprise short-range wireless transceiver means the communication distance of which defines the predetermined maximum allowed distance range and is less than 10 meters,
wherein, for communicating with each other, the first wireless communication means and the second wireless communication means comprise short-range wireless transceiver means based on a technology selected in a group consisting of RFID (Radio Frequency Identification), NFC (Near Field Communication), IrDA (infrared), bluetooth, ISM band, UWB (Ultra Wide Band), Wireless HART, ZigBee,
wherein the portable electronic device is a mobile phone,
wherein the second wireless communication means comprise wireless connection means adapted to connect to a telecommunication network and to communicate, by means of the telecommunication network, with a remote computer for the transmission of the traceability data-sets to the central database, and
wherein the first and second wireless communication means comprise and use a first wireless communication system for the transmission of identification data of the portable tool and a different second wireless communication system for the transmission of the data representative of the work cycle parameters.

* * * * *